US009810943B2

(12) United States Patent
Whitehead et al.

(10) Patent No.: US 9,810,943 B2
(45) Date of Patent: Nov. 7, 2017

(54) PARALLAX REDUCTION

(71) Applicant: Dolby Laboratories Licensing Corporation, San Francisco, CA (US)

(72) Inventors: Lorne A. Whitehead, Vancouver (CA); Vincent Kwong, Vancouver (CA); Helge Seetzen, Westmount (CA); Gregory John Ward, Berkeley, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/028,341

(22) Filed: Sep. 16, 2013

(65) Prior Publication Data

US 2014/0029244 A1 Jan. 30, 2014

Related U.S. Application Data

(63) Continuation of application No. 12/811,495, filed as application No. PCT/US2008/088024 on Dec. 22, 2008, now abandoned.

(60) Provisional application No. 61/019,803, filed on Jan. 8, 2008.

(51) Int. Cl.
*H01L 33/60* (2010.01)
*H01L 33/58* (2010.01)
*G02F 1/1335* (2006.01)

(52) U.S. Cl.
CPC .. *G02F 1/133606* (2013.01); *G02F 1/133603* (2013.01); *G02F 1/133605* (2013.01)

(58) Field of Classification Search
CPC ...... G02F 1/1336; G02F 1/133602–1/133606; G02F 1/133608–1/133611; G02F 1/133615; G02F 1/133617; G02F 1/13362; G02F 1/133621; G02F 2001/133601; G02F 2001/133607; G02F 2001/133612–2001/133614; G02F 2001/133616; G02F 2001/133618; G02F 2001/133622–2001/133628; F21V 7/04–7/09
USPC ............................................... 362/97.1–97.3
See application file for complete search history.

(56) References Cited

U.S. PATENT DOCUMENTS

| 5,837,346 | A | * | 11/1998 | Langille | ............... | G02B 5/0221 |
| | | | | | | 359/460 |
| 5,978,142 | A | | 11/1999 | Blackham | | |
| 6,891,672 | B2 | | 5/2005 | Whitehead | | |
| 7,403,332 | B2 | | 7/2008 | Whitehead | | |
| 7,492,513 | B2 | | 2/2009 | Fridman | | |
| 2003/0117704 | A1 | * | 6/2003 | Lippey et al. | ................ | 359/443 |

(Continued)

FOREIGN PATENT DOCUMENTS

| CN | 1844988 | 10/2006 |
| CN | 200953347 | 9/2007 |

(Continued)

*Primary Examiner* — Mariceli Santiago

(57) ABSTRACT

Parallax in an optical device is reduced by apply one or a combination of several disclosed techniques, including reduced solid angle or increased collimation of light sources, increased diffusion/scattering at an output of the device, and/or reflective structures for collimation and containment of reflected light. The techniques are advantageously applied to a backlight LCD display, and particularly to high dynamic range dual modulation displays.

13 Claims, 4 Drawing Sheets

(56) References Cited

U.S. PATENT DOCUMENTS

| | | | |
|---|---|---|---|
| 2004/0080938 A1* | 4/2004 | Holman | F21S 8/08 362/231 |
| 2005/0073495 A1 | 4/2005 | Harbers | |
| 2005/0219836 A1* | 10/2005 | Hung | G02F 1/133606 362/97.2 |
| 2005/0265029 A1* | 12/2005 | Epstein et al. | 362/339 |
| 2005/0276069 A1* | 12/2005 | Taniguchi | G02F 1/133603 362/600 |
| 2006/0087866 A1 | 4/2006 | Ng | |
| 2006/0146530 A1 | 7/2006 | Park | |
| 2006/0215075 A1* | 9/2006 | Huang et al. | 349/67 |
| 2006/0221611 A1* | 10/2006 | Noh | G02F 1/133603 362/247 |
| 2007/0014111 A1* | 1/2007 | Lee | G02B 5/0221 362/246 |
| 2007/0052662 A1 | 3/2007 | Kim | |
| 2007/0052663 A1 | 3/2007 | Kim | |
| 2007/0134438 A1 | 6/2007 | Fabick | |
| 2007/0189019 A1 | 8/2007 | Klipstein | |
| 2007/0236628 A1* | 10/2007 | Epstein | 349/67 |
| 2008/0137324 A1 | 6/2008 | Pastore | |
| 2008/0143263 A1 | 6/2008 | Lee | |
| 2008/0211989 A1 | 9/2008 | Park | |
| 2008/0231780 A1 | 9/2008 | Graf | |

FOREIGN PATENT DOCUMENTS

| | | | |
|---|---|---|---|
| JP | 7-218705 | 8/1995 | |
| JP | 11-329004 | 11/1999 | |
| JP | 2000-111887 | 4/2000 | |
| JP | 2001-067914 | 3/2001 | |
| JP | 2002-049326 | 2/2002 | |
| JP | 2003-504682 | 2/2003 | |
| JP | 2004-219926 | 8/2004 | |
| JP | 2004-253238 | 9/2004 | |
| JP | 2004-273130 | 9/2004 | |
| JP | 2005-084195 | 3/2005 | |
| JP | 2005-321693 | 11/2005 | |
| JP | 2006-501503 | 1/2006 | |
| JP | 2006-504116 | 2/2006 | |
| JP | 2006-092983 | 4/2006 | |
| JP | 2006-190636 | 7/2006 | |
| JP | 2006-210273 | 8/2006 | |
| JP | 2006-520518 | 9/2006 | |
| JP | 2006-267991 | 10/2006 | |
| JP | 2007-048624 | 2/2007 | |
| JP | WO 2012029601 A1 * | 3/2012 | G02F 1/133605 |
| KR | 10-2003-0080764 | 10/2003 | |
| KR | 2003-0080764 | 10/2003 | |
| KR | 10-2006-0115124 | 11/2006 | |
| KR | 10-2007-0093405 | 9/2007 | |
| KR | 2007-0103639 | 10/2007 | |
| WO | 99/56158 | 11/1999 | |
| WO | 02/03687 | 1/2002 | |
| WO | 2006/055195 | 5/2006 | |
| WO | WO 2006045586 A1 * | 5/2006 | |
| WO | 2006/071494 | 7/2006 | |
| WO | 2007/037035 | 4/2007 | |
| WO | 2007/057834 | 5/2007 | |
| WO | 2007/148508 | 12/2007 | |
| WO | WO 2008045181 A1 * | 4/2008 | |
| WO | 2008-108480 | 9/2008 | |

* cited by examiner

PARALLAX REDUCTION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Field of Invention

The present invention relates to Parallax reduction.

Discussion of Background

Dynamic range is the ratio of intensity of the highest luminance parts of a scene and the lowest luminance parts of a scene. For example, the image projected by a video projection system may have a maximum dynamic range of 300:1.

The human visual system is capable of recognizing features in scenes which have very high dynamic ranges. For example, a person can look into the shadows of an unlit garage on a brightly sunlit day and see details of objects in the shadows even though the luminance in adjacent sunlit areas may be thousands of times greater than the luminance in the shadow parts of the scene. To create a realistic rendering of such a scene can require a display having a dynamic range in excess of 1000:1. The term "high dynamic range" means dynamic ranges of 800:1 or more.

Modern digital imaging systems are capable of capturing and recording digital representations of scenes in which the dynamic range of the scene is preserved. Computer imaging systems are capable of synthesizing images having high dynamic ranges. However, current display technology is not capable of rendering images in a manner which faithfully reproduces high dynamic ranges.

Blackham et al., U.S. Pat. No. 5,978,142 discloses a system for projecting an image onto a screen. The system has first and second light modulators which both modulate light from a light source. Each of the light modulators modulates light from the source at the pixel level. Light modulated by both of the light modulators is projected onto the screen.

Gibbon et al., PCT application No. PCT/US01/21367 discloses a projection system which includes a pre modulator. The pre modulator controls the amount of light incident on a deformable mirror display device. A separate pre-modulator may be used to darken a selected area (e.g. a quadrant).

Whitehead et al., U.S. Pat. No. 6,891,672, and related patents and patent applications describe many techniques, including, among others, the implementation and refinement of dual modulated displays, wherein a modulated backlight (aka local dimming) projects onto a front modulator (e.g., LCD) of a display.

SUMMARY OF THE INVENTION

The present inventors have realized the need for a reduction in parallax in displays and related optical equipment. Roughly described, the invention comprises reducing parallax in a display via a reduction in solid angle of a backlight and/or an increase in diffusion/scattering at an output of the display. Various alternatives for each are provided.

In one embodiment, the present invention comprises a display comprising a backlight comprising an array of light sources and an array of substantially lambertian reflectors wherein each reflector surrounds one of the light sources. The reflectors may comprise, for example, a flower structured reflector (e.g., 6 sided flower reflectors). The reflectors may comprise a structure that, for example, is configured to re-reflect light originating from a light source surrounded by the reflector and reflected back toward the backlight from a panel of the display.

In another embodiment, the invention may comprise a display comprising a locally dimmed LED backlight array and a set of lenses configured to collimate light. The lenses may, for example, be mounted directly to the LED backlights.

In another embodiment, the invention may comprise a high dynamic range high definition display, comprising a locally dimmed LED backlight and a textured diffuser configured to reduce parallax. The textured diffuser may comprise, for example, a surface textured diffuser. The surface texture may comprise, for example, a sandblast type pattern texture. The textured diffuser may be configured, for example, to cause increased diffusion with less absorption than an equivalently diffuse but thicker diffuser. Alternatively, the textured diffuser may comprise, for example, an acrylic diffuser that has been textured by sandblasting.

In yet another embodiment, the present invention comprises a reduced parallax display comprising a collimated backlight structure with substantially lambertian reflectors. The invention may further comprise a sandblast patterned textured diffuser. The collimated backlight structure may comprise, for example, an array of light sources each comprising a collimating lens. In one exemplary alternative, the collimated backlight structure comprises a locally dimmed LED array. In one embodiment, the reflectors comprise flower reflectors.

In still yet another embodiment, the present invention comprises a locally dimmed high dynamic range display comprising a backlight with a reduced solid angle and an increased diffusion and scatter diffuser at an output of the display. The reduced sold angle may be achieved, for example, via optics configured to collimate light emitted from the backlight. In one embodiment, the display has a contrast ratio that exceeds 1000:1. In another embodiment, the backlight comprises an array of LEDs where each LED is surrounded by a lambertian reflector configured to re-reflect light originating from a surrounded LED reflected back towards the surrounded LED in a direction toward a front panel.

In other embodiments, the display or optical devices according to the present invention may include electronics, processors, or other devices for driving the light sources and panels (e.g., LCD panels) so as to create images for display. Such driving includes, for example, providing signals to drive the display in a manner that efficiently produces the images without or with reduced artifacts caused by either any source, including, for example, a structure of the display and a scheme used to drive the display.

The present invention in any of the forms described herein may be embodied in one or more of a device, apparatus, method, process, algorithm, apparatus, mechanism, or other forms.

In addition, various components of the present invention including backlight or front modulator drive electronics may represented in a computer program, data sequences, and/or control signals, etc. and may be embodied as instructions stored by a computer readable media or as instructions contained in an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present invention comprises a new process which improves the viewing quality of certain devices by reducing parallax. Preferably, the invention is applied to individually modulated, direct-lit backlight display units which can greatly benefit from a minimization of the amount of parallax they exhibit. The invention may be embodied in any of the methods and structures described herein which can be used individually, or in combination, to reduce parallax.

Figure 1:
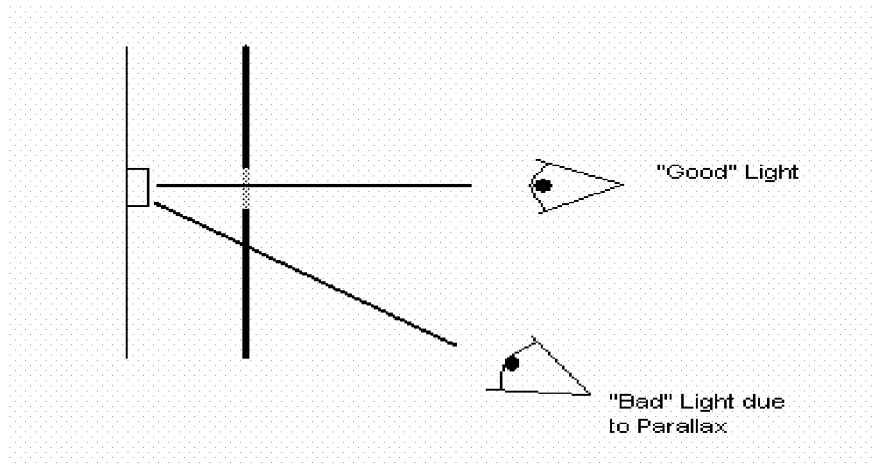
FIG. 1 is an illustration of parallax.

Referring now to the drawings, wherein like reference numerals designate identical or corresponding parts, and more particularly to FIG. 1 thereof, there is illustrated an LED light source being viewed. As shown in FIG. 1, Parallax in a direct lit backlight occurs when light from the light source exits the LCD in areas where it is unwanted, due to line of sight effects.

Figure 2:
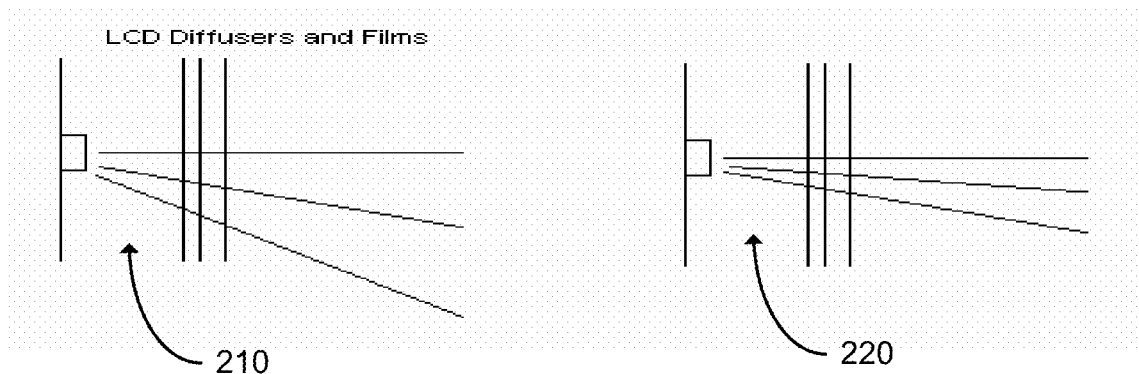
FIG. 2 is an illustration of a reduction of parallax by reducing the solid angle of the light source.

The present invention relates to solutions for reducing parallax, including two described now. The first involves reducing the solid angle of the outgoing light from the light source. By way of example, as shown in FIG. 2, a solid angle of outgoing light 210 is reduced to a reduced outgoing solid angle 220, that tends to collimate the outgoing light. The amount of reduction of parallax will depend on how much the solid angle is reduced (i.e. how much the light source is collimated).

Figure 3:
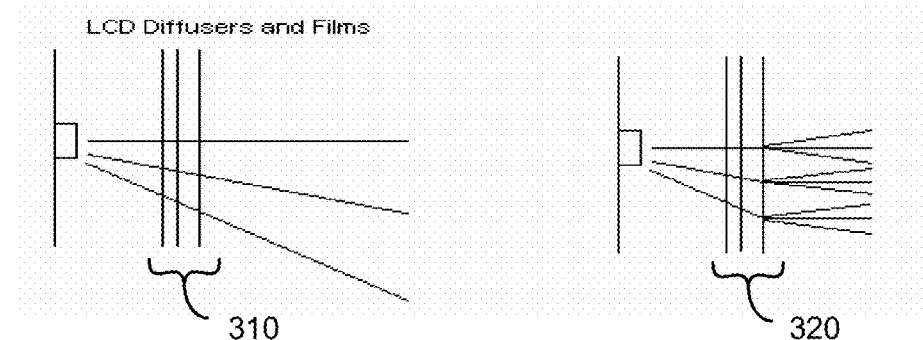
FIG. 3 is an illustration of a reduction of parallax by additional diffusion.

The second solution reduces parallax by removing the directionality of light emitted at the exit surface of the backlight unit. By way of example, as illustrated in FIG. 3, a reduction of parallax by additional diffusion. Light passing through LCD diffusers and films 310 in conventional backlight displays still contain a significant amount of directionality upon exiting the backlight unit. By adding more diffusion to the film stack (e.g., additional diffusion diffuser 320), more scattering will occur, leading to a reduction in parallax.

Figure 4:
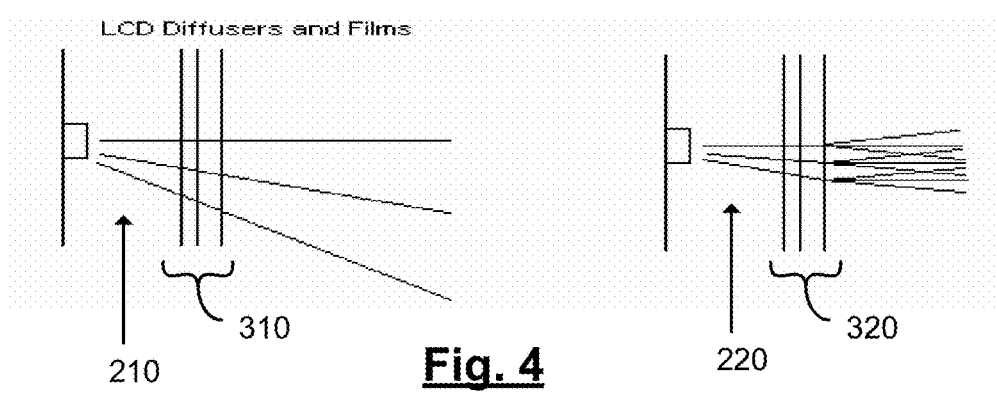
FIG. 4 is an illustration of a reduction of parallax by reducing the solid angle of the light source and by additional diffusion.

Ideally, a combination of the two solutions would provide the best reduction of parallax. As shown in FIG. 4, an example of a reduced outgoing solid angle 220 combined with additional diffusion diffuser 320.

The inventors have experimentally determined three inventive structures and methods for these two solutions. All three help reduce parallax to varying degrees without substantially reducing the efficiency of the backlight unit. Reducing parallax without increasing light absorption is very important for maintaining the brightness of the backlight unit. These three methods, when combined, provide the best means of reducing parallax in a direct-lit backlight unit.

Figure 4B:
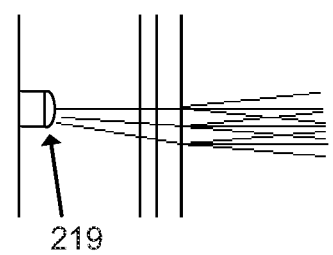
FIG. 4B is an embodiment of the present invention illustrating a collimation lens of some sort mounted directly to an LED.

The first solution involves collimation of the LED light source. One possible method would be to use a collimation lens of some sort mounted directly to the LED (e.g., see FIG. 4B, lens 219). A collimated LED (e.g., Cree XRE7090) will help to reduce any parallax effects, simply due to the fact that the solid angle of the output of the LED is reduced for a collimated light source. It is this solid angle that is responsible for parallax. The more collimated the LED, the more of a reduction in parallax occurs. However, there is a practical limit to the amount of collimation. If the source is too collimated, then you will not get a uniform LED backlight for a given LED density. Also, a completely collimated light source may not be the best solution if brightness enhancement film (BEF) is present in the LCD film stack. This is because BEF does not allow collimated light to pass through.

The second solution involves the surface texturing of both sides of the standard, thick, bulk scattering diffuser found in all conventional direct CCFL backlight units. This surface texturing provides additional diffusion and scattering, eliminating the directionality component of the outgoing light. Because it is this directionality that is responsible for parallax, eliminating or reducing this directionality will correspondingly reduce parallax.

A similar reduction in directionality could be accomplished by using a thicker diffuser with more bulk scattering. However, this thicker diffuser would substantially decrease the brightness of the backlight unit because of increased absorption effects. The textured diffuser (e.g., a standard acrylic diffuser which had been textured by sandblasting) adds the extra diffusion necessary for the reduction of parallax without such a significant added cost of increased absorption.

Figure 5:
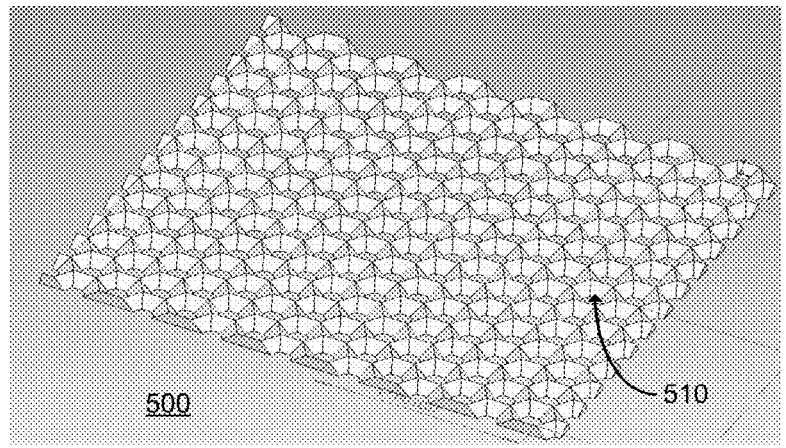
FIG. 5 is an illustration of an LED Reflector Array.

The third solution uses a reflector structure surrounding the LED. FIG. 5 illustrates one variation of an array 500 of such a reflector structure 510.

The reflective surfaces of this structure are substantially Lambertian in nature. It was observed that if the reflective surfaces were substantially specular, then the edges of the reflector could be clearly seen through the LCD films, which negatively affect the visual uniformity of the display. The purpose of these reflective surfaces is to collimate the light leaving the LED.

Figure 6:
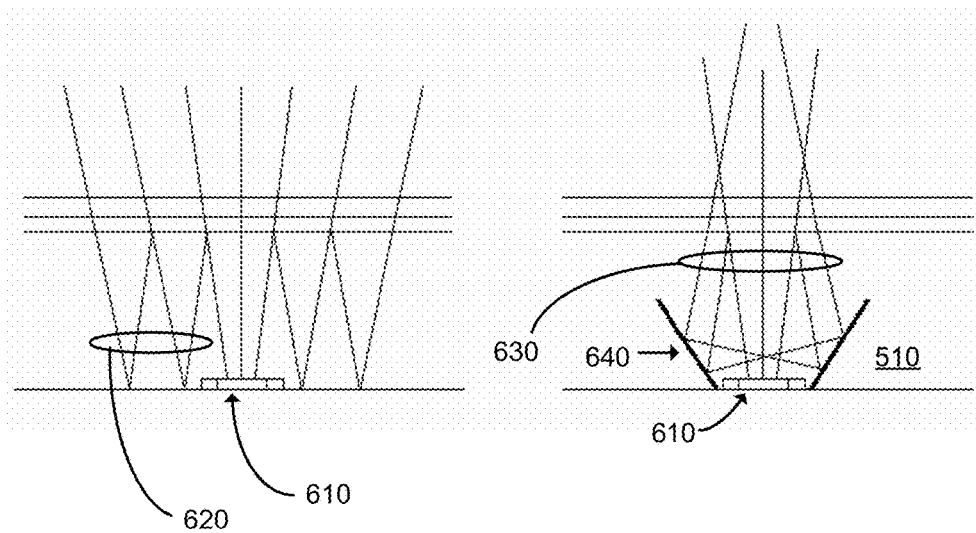
FIG. 6 is an illustration of using the LED reflector to collimate the LED output.

It is also helpful to contain and re-collimate any light that is reflected back by the LCD films. The net effect is to reduce parallax by containing the light within a specific solid angle relative to the light source, with the angle of the reflector walls controlling the solid angle. This idea is demonstrated in the FIG. 6 (which includes a side cut-away view of an individual flower/flowered reflector 510). As shown in FIG. 6, an LED 610 without a reflector structure exhibits reflections 620. However, FIG. 6 also illustrates an LED with a lambertian reflector 510 (one side of the lambertian reflector is referenced by 640). In the reflector, light output 630 does not show diffusion/scattering associated with diffuser films both on transmission and reflection, and does not show the scattering associated with the Lambertian surface of the flower.

The present invention may be applied to LCD type High Definition Televisions (HDTVs) and displays, any of which may also be configured to produce High Dynamic Range (HDR) with contrast ratios of greater than, for example, 1000:1. The invention may be suitably adapted for LED or other backlight devices that incorporate local dimming or any type of backlight modulation.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing surface texturing via sand blasting, any other equivalent process for texturing or materials having an equivalent type of texture, function, or capability, whether or not listed herein, may be substituted therewith. Furthermore, the inventors recognize that newly developed technologies not now known may also be substituted for the described parts and still not depart from the scope of the present invention. All other described items, including, but not limited to reflector structures (including flower like structures), collimated LEDs (white or colored), diffusers, light sources, etc should also be considered in light of any and all available equivalents.

The present invention may suitably comprise, consist of, or consist essentially of any of the elements, parts, or features as described herein (e.g., more diffusion in stacked layers, textured and/or collimated light sources, reflectors, reflector arrays), and their equivalents. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of claims to be appended in a soon to be filed utility patent application, the invention may be practiced otherwise than as specifically described herein.

What is claimed is:

1. A high dynamic range high definition display, comprising:
    a backlight comprising an n×m array of locally dimmed LEDs;
    a reflector comprising an n×m array of reflective structures, each reflective structure comprising a set of reflective walls, with each LED being surrounded by its own separate reflective structure such that direct light from one LED does not illuminate a second neighboring LED; and
    a modulating panel placed over the array of locally dimmed LEDs and the array of sets of reflective walls;
    wherein:
    each reflector wall surrounding each LED is angled from the normal direction from the backlight such that the light originating from the LED and reflected from the modulating panel back toward the LED is substantially re-reflected by the reflector walls to be contained within a solid angle relative to the LED, the solid angle substantially reducing parallax illumination from the LED.

2. The display according to claim 1, wherein an output of the modulating panel is projected to a user.

3. The display according to claim 1, wherein the reflective walls are of a material such that reflections from the walls exhibit Lambertian qualities.

4. The display according to claim 1, further comprising brightness enhancement films as a coating on the modulating panel.

5. The display according to claim 4, further comprising an output diffuser positioned at an output side of the modulating panel, and wherein said reflectors maintaining a collimation of light emitted from each LED through the modulating panel configured to further modulate the locally dimmed light from said LEDs without significant parallax from adjacent LEDs, and the display further configured to disperse the further modulated light in a manner that would have occurred without said collimation, but with significant parallax, via the output diffuser.

6. The display according to claim 5, wherein the output diffuser causes increased diffusion with less absorption than an equivalently diffuse but thicker diffuser.

7. The display according to claim 1, wherein the reflective walls are part of an optical structure that causes the backlight to be collimated.

8. The display according to claim 7, further comprising a collimating lens associated with light source.

9. The display according to claim 8, wherein the reduced solid angle is achieved via optics configured to collimate light emitted from the backlight.

10. The display according to claim 1, wherein the display has a contrast ratio that exceeds 1000:1.

11. The display according to claim 1, wherein the reflectors are configured to re-reflect light originating from the surrounded LED and reflected back towards the surrounded LED in a direction toward the modulating panel.

12. The high dynamic range display according to claim 1, further comprising a collimating mechanism disposed between the LEDs and modulating panel comprising an optical stack of films, and wherein a textured diffuser is incorporated within the optical stack of films in a manner to be operative on a directionality of light output from the LCD panel.

13. A high dynamic range high definition display, comprising:
    a backlight comprising an n×m array of locally dimmed LEDs;
    a reflector comprising an n×m array of reflective structures, each reflective structure comprising a set of reflective walls, with each LED being surrounded by its own separate reflective structure such that direct light from one LED does not illuminate a second neighboring LED; and
    a modulating panel placed over the array of locally dimmed LEDs and the array of sets of reflective walls;
    wherein:
    each reflector wall surrounding each LED is angled from the normal direction from the backlight such that the light originating from the LED and reflected from the modulating panel back toward the LED is substantially re-reflected by the reflector walls to be contained within a solid angle relative to the LED, the solid angle substantially reducing parallax illumination from the LED;
    the display further comprising brightness enhancement films as a coating on the modulating panel;
    the display further comprising an output diffuser positioned at an output side of the modulating panel, and wherein said reflectors maintaining a collimation of light emitted from each LED through the modulating panel, the modulating panel further modulates the locally dimmed light from said LEDs into an output image exhibiting less parallax from adjacent LEDs compared to light from LEDs without collimation, and the output diffuser further disperses the further modulated light in a reduced viewing angle;

wherein the output diffuser is an acrylic diffuser that has been textured by sandblasting.

\* \* \* \* \*